Dec. 4, 1962 C. G. CAIN 3,066,948
VEHICLE SUSPENSIONS
Filed Nov. 20, 1959 2 Sheets-Sheet 1

Inventor
Clifford G. Cain
By Wallace and Cannon
Attorneys

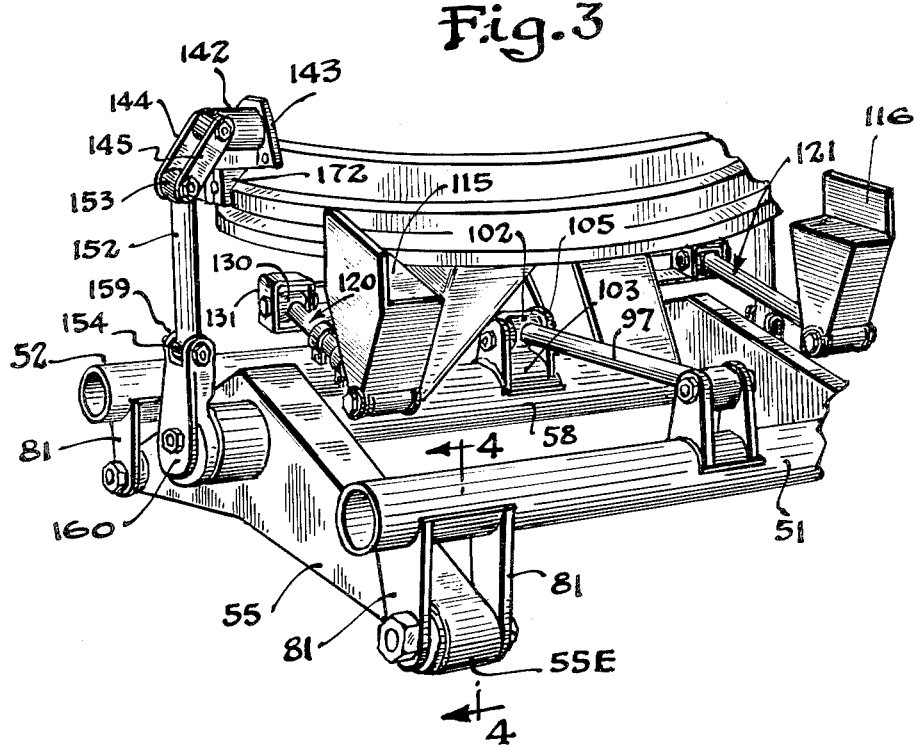
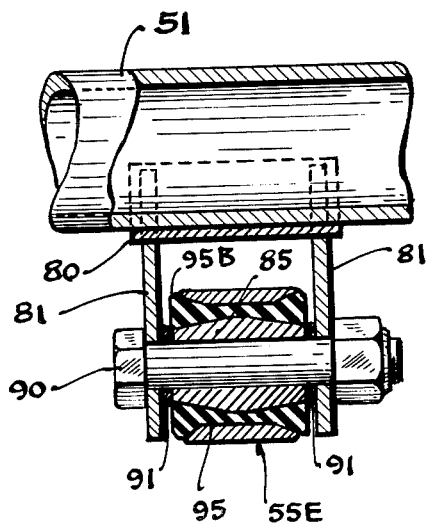

United States Patent Office 3,066,948
Patented Dec. 4, 1962

3,066,948
VEHICLE SUSPENSIONS
Clifford G. Cain, Springfield, Mo., assignor to A. J. Industries, Inc., Springfield, Mo., a corporation of West Virginia
Filed Nov. 20, 1959, Ser. No. 854,287
10 Claims. (Cl. 280—104.5)

This invention relates to a spring suspension for a tandem axle vehicle and in particular to a suspension of this kind embodying pneumatic spring means.

The conventional method for connecting tandem axles to a frame or chassis is by way of semi-eliptical leaf springs, one for each axle with the related axle connected to the center of the spring. The springs are arranged in tandem relation one behind another with the fore end of the fore spring supported by a bracket secured to the vehicle frame and with the aft end of the aft spring also supported by a bracket secured to the vehicle frame. In most instances the adjacent inner ends of the springs are connected to an equalizer to enable a severe load impressed on one axle to be in part transmitted to the other axle.

Other equalizer systems have also been employed for tandem axle suspensions in order to remove part of a load on one axle and impress this on the other axle, and an example of such other systems is a single leaf spring serving as a rocker beam with the opposite ends thereof respectively connected to the front and rear axles of the vehicle. Suspensions such as this require many appurtenant parts in order to achieve stability and proper functioning throughout the expected range and types of load requirements.

The primary object of the present invention is to replace springs of the foregoing kind with a frame-mounted pneumatic chamber constituting a pneumatic suspension for tandem axles and to relate a rocker beam and torque arms thereto in such a manner as to enable load equalizing between the two axles to be realized while minimizing strains or distorting forces on the diaphragm of the pneumatic chamber. A related object of the present invention is to accomplish load equalizing without relying upon movement of the pneumatic spring, in contradistinction to load equalizing loads between the axles.

It has, of course, been heretofore proposed to replace semi-eliptical springs with a pneumatic suspension. However, sway control is one of the major problems encountered with pneumatic suspensions, since a suspension of this kind having no sway compensation is like a coil spring in a vehicle having no sway compensation. Therefore, another object of the present invention is to embody sway control mechanism in a pneumatic suspension achieving the foregoing objects and to do this in such a way that the connections are of a minimum number but account for several distinct advantages, and further to do this in such a way as to limit to a relatively small degree the amount by which the frame and axles of the vehicle can be vertically displaced. Another object of the present invention is to associate with the foregoing suspension means which will adjust air pressure within the air chamber in response to movement of the diaphragm of the air chamber.

Other and further objects of the present invention will be apparent from the following description and claims and are illustrated in the accompanying drawings which, by way of illustration, show a preferred embodiment of the present invention and the principle thereof and what is now considered to be the best mode contemplated for applying this principle. Other embodiments of the invention embodying the same or equivalent principles may be used and structural changes may be made as desired by those skilled in the art without departing from the present invention and the purview of the appended claims.

In the drawings:

FIG. 3 is a partial perspective of the suspension shown in FIG. 1; and

FIG. 4 is a detail sectional view of a coupling taken on the line 4—4 of FIG. 3.

Figure 1:
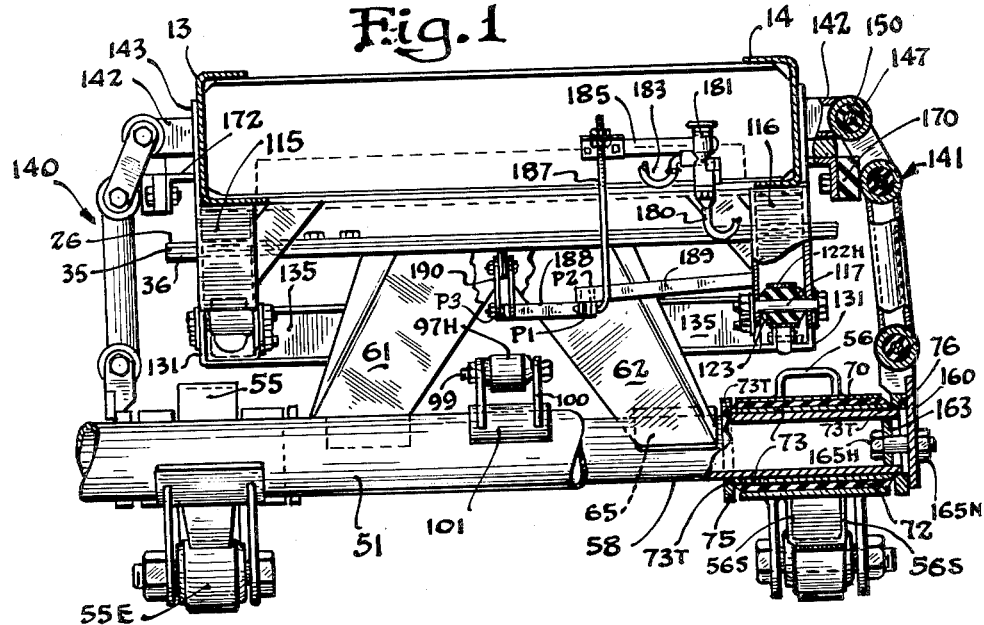
FIG. 1 is an end elevation, partly broken, of a tandem axle suspension constructed in accordance with the present invention.
Figure 2:
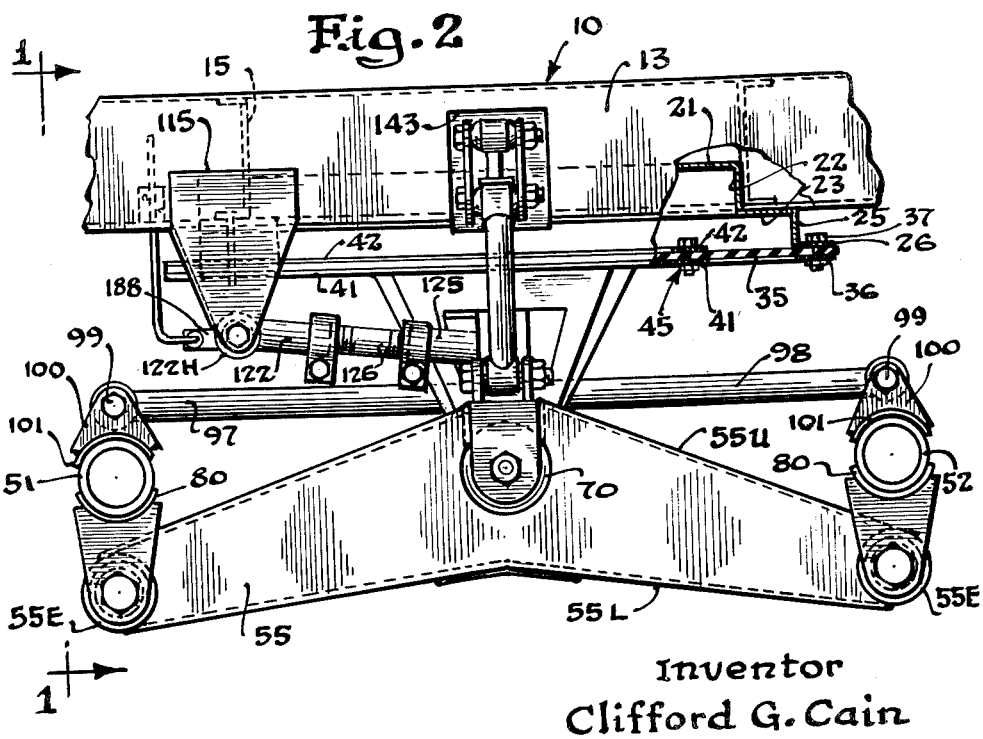
FIG. 2 is a side elevation, also partly broken away, of the suspension illustrated in FIG. 1.

The pneumatic suspension in the present instance embodies an air chamber or tank that is built into the frame of the vehicle, and the vehicle frame is identified at 10 in FIG. 2, such frame comprising a pair of elongated channel members 13 and 14, FIG. 1, rigidly interconnected by braces 15, FIG. 2. The air chamber comprises a rigid housing having a top plate 21, and a peripheral depending rim 22 cast integral therewith, FIG. 2, located between a pair of cross members 15. The top plate 21 is disposed in plane spaced above the bottom of the vehicle frame as will be evident in FIG. 2, and the lower edge of the rim 22 terminates at the bottom of the vehicle frame. A substantially Z-shaped mounting plate for a diaphragm is provided, and this plate is formed with a horizontal base 23 which is adapted to bear against the undersides of the lower flanges included in the longitudinal frame members 13 and 14. The base 23 is welded to the lower edge of the rim 22. Extending downward from the outer peripheral edge of the base 23 is a depending leg 25, and this leg is integral with an outwardly extending flange 26 that is disposed in a horizontal plane spaced below the frame of the vehicle.

Thus, it will be seen that the air chamber housing is nested in the frame of the vehicle and includes a circular flange 26 disposed in a plane below the frame of the vehicle. This housing has an open bottom, and a flexible diaphragm is associated with the housing to complete the air chamber. During operation of the vehicle, this diaphragm will flex an amount determined by the degree of loading on the axles of the vehicle, or by the nature of the road surface being traversed by the vehicle wheels, and the air pressure within the air chamber will resist such flexing of the diaphragm thereby constituting a pneumatic spring. The diaphragm thus afforded is indicated at 35 in FIG. 2 and consists of a relatively thick pad of durable rubber. The rubber diaphragm 35 is of a size to neatly fit about the rim or flange 26 of the air chamber housing and is clamped thereto to seal off the housing and afford the chamber as will be evident in FIG. 2. This is accomplished by arranging an annular disc 36, complementary to the rim 26, on the underside of the diaphragm 35, and numerous fastening bolts 37 are fastened in place between the flange 26 and disc 36 to interconnect these parts and tightly clamp the interposed margin of the diaphragm therebetween in an air-tight relationship.

The diaphragm 35 is of course a solid one-piece part, but in order to reinforce the diaphragm and to enable connections to be made thereto as will be described below, a solid plate 41 is disposed on the outer side of the diaphragm for most of the area thereof. A ring member 42 is disposed on the inner face of the diaphragm and has an outer diameter corresponding to the outer diameter of the plate 41. The members 41 and 42 are tightly secured to the diaphragm 35 by numerous nut and bolt assemblies 45 as shown in FIG. 2, and it should be pointed out that for purposes of clarity only a few of the nut and bolt fasteners 37 and 45 are illustrated herein.

The axles of the vehicle are shown in the form of tubes 51 and 52 but it will be appreciated that the configuration of the axle is immaterial. In any event, the suspension in the present instance assumes the presence of tandem axles, and in equalizing the load between the axles resort is had to a pair of rocker beams or so-called cradles 55 and 56, FIGS. 1 and 2, which at their outer ends carry the axles. These beams are pivotally associated with a center support tube 58 which in turn is connected by struts 61 and 62, FIG. 1, to the underside of the plate 41 described above. Thus, loads impressed on the axles are also impressed on the support member 58 and are transmitted to the diaphragm 35. Due to the pivotal mounting for the rocker beams 55 and 56, loads will be equalized between the axles as will be evident from the detailed description to follow.

The center tube 58, as shown in FIGS. 1 and 3, is of such dimension that the opposite ends are extended well beyond the outer sides of the vehicle frame. The struts 61 and 62 are in the form of rugged angle members so as to provide maximum strength with as little weight possible, and the upper end of each strut is welded to the underside of the plate 41 which is connected to the diaphragm 35. The upper ends of the struts 61 and 62 are preferably quite wide in order to obtain an optimum degree of extensive contact with the plate or disc 41. The struts 61 and 62 substantially abut where they are joined to plate 41, and the struts are divergent one to another so that the lower ends are spread quite far apart as will be evident in FIG. 1. Each strut is provided at its lower end with an arcuate shoe 65 which is complemental to the shape of the center tube 58, and each such shoe is welded to the center tube.

As mentioned above, the rocker beams 55 and 56 are pivotally associated with the center tube 58, and in accomplishing this, identical constructions are used for each rocker beam. Hence a description of the pivotal connection for one rocker beam suffices to explain the pivotal connection for both rocker beams, and reference characters are interchangeable. Thus, it will be noted from FIG. 1 that each rocker beam is hollow in cross section, having spaced upper and lower walls as 55U and 55L, FIG. 2, and spaced side walls as 56S, FIG. 1. Referring to FIG. 2, each rocker beam is of symmetrical configuration fore and aft of the center, such that the side walls of the rocker beams are generally triangular shaped. The top walls in each instance slope downwardly away from the center tube.

A mounting sleeve 70 of relatively large diameter is passed through an aperture located at substantially the geometrical center of each rocker beam, and this sleeve, as will be noted in FIG. 1, has end portions projecting respectively inward toward the struts and outward toward the outer ends of the center tube 58. These sleeves 70 are welded to the rocker beams and are coaxial with the center tube 58 so as to be capable of being telescoped thereover. However, the inside diameter of the sleeve 70 in each instance is substantially larger than the outside diameter of the center tube 58. A rubber bushing 72 of predetermined torsion spring rate is afforded, and a metallic bushing 73 is bonded to the inside of the rubber bushing 72. The rubber bushing and metallic sleeve assembly thus afforded is then pressed into the sleeve 70 and the whole is pressed on to the corresponding end of the center tube 58, the dimensioning of the parts being such that a tight press fit is established between sleeve 73 and the center tube 58 when the rocker beam and its associated sleeve and bushing assembly are mounted on the end of the center tube. Accordingly a rocker beam is free to pivot on the center tube against the limited torsional resistance of the related bushing as 72. The bushing assemblies are held in place on the center tube by clamp rings 75 and 76 which are pressed on to free tapered ends 73T of the sleeve 73. The inner ring 75 is preferably welded in place, and the outer ring has a constant inwardly directed force applied thereto as will be explained. Preferably, the bushings or bearings 72 allow the axles of the vehicle to move in a vertical direction with only limited restrictions, thereby permitting large amounts of height variations between the wheels of the vehicle.

The axles 51 and 52 are carried by the rocker beams. The connections for both axles are identical and again the reference characters are interchangeable. Thus, shoes 80 of arcuate shape complementary to the axles 51 and 52 are welded to the undersides thereof as shown in FIGS. 2 and 4. A pair of ears 81, FIG. 4, are welded in depending relation to the underside of each shoe 80. The end of each rocker beam has an apertured head 55E welded thereto, and the space between the ears 81 is slightly greater than the width of the associated head 55E to enable the headed end of each rocker beam to be disposed between the axle connectors 81 as shown in FIG. 4.

A sleeve 85, FIG. 4, is disposed between the connectors 81 and is located concentrically within the head 55E at an end of the rocker beam. Sleeve 85 is provided with a central bore of uniform diameter so as to be capable of having a slight press fit on the shank of a bolt 90 which serves as a pin. The bolt 90 is sized to have the threaded end thereof extended beyond the inner one of the ears 81, and spacers 91 are afforded between the inside faces of the ears 81 and the outer ends of the sleeve 85.

It will be noted in FIG. 4 that the outer surface of the sleeve 85 is sloped or tapered so as to have ends of substantially equal outside diameter but a central section of larger diameter. A rubber bushing 95 is bonded to the outer surface of the tapered sleeve 85, and this rubber bushing with the sleeve 85 bonded thereto is press-fitted into the aperture of the rocker beam head. In this connection, it will noted that the ends of the aperture in the head 55E are tapered or sloped in a direction opposite that of the slope on the sleeve 85. This relationship of surfaces and parts helps keep the head 55E centered between the ears 81, eliminates metal-to-metal contact, and the end bulges 95B on the bushing 95 prevent contact between the ears 81 and the sides of the head 55E.

Torque rods or arms 97 and 98, FIG. 2, are associated with the suspension in such a manner as to resist axle rotation while at the same time affording in cooperation with the rocker beams a parallelogram of arms which assures that the axles during vertical movement move in true vertical planes. These torque arms, as best shown in FIGS. 1 and 2, are pivotally secured at their outer ends to bolts as 99, supported by ears 100, integral with a shoe 101 which in turn is welded to the center of the related axle. The pivotal connections between the heads as 97H at the outer ends of the torque arms 97 and 98 are similar to that shown in FIG. 4.

The torque arms 97 and 98 are provided at their inner ends with heads 102, FIG. 3, and these are pivotally secured to the center tube 58. To this end, a shoe 103, FIG. 3, is welded to the central area of the center tube 58 between the struts 61 and 62, and a pair of ears 105 are secured in spaced relation to the shoe 103 so as to extend upwardly therefrom. The ears 105 are each formed with a pair of apertures, and connections similar to those described above in connection with FIG. 4 are afforded between the heads as 102 and the ears 105 to pivotally associate the head 102 of each torque arm with the center tube mounting bracket 103—105.

It is important that the diaphragm be strained as little as possible, and therefore other torque arms are associated with the suspension in order to assure substantially true vertical motion of the diaphragm 35 during operation of the suspension in contrast to a twisting of the diaphragm out of its normal operating plane. Such twisting or tilting of the diaphragm can occur during braking, or when starting the vehicle. These other torque arms are connected at one end to the frame of the vehicle and at the other end are connected by extensions to the struts 61 and 62, the latter, of course, representing parts that transmit motion of the center tube 58 to the diaphragm. Additionally, these other torque arms also prevent twisting of the diaphragm in its own plane as may tend to happen when, for example, the wheels at one side only of the suspension should encounter a hole in the road.

In making provision for the foregoing, a pair of brackets 115 and 116, FIG. 1, are connected to the outer faces of the vehicle frame members 13 and 14 and depend therebelow. Each such bracket is provided at its lower end with a pair of apertured ears for receiving a bolt 117, FIG. 1, which enables a torque rod to be pivotally associated with the frame-mounted bracket. The torque arms in this instance are identified as 120 and 121, FIG. 3, and of these torque arms, the arm 120 is of a multi-part construction enabling adjustments to be made therein incidental to aligning the axles with the longitudinal center line of the vehicle. Thus the torque arm 120 includes an end tube 122, FIG. 2, having a head 122H formed with an opening therein adapted to receive a rubber bushing as 123, FIG. 1, and this bushing in turn is mounted on the support bolt as 117 thereby affording the aforementioned pivotal connection.

The torque arm 120 includes a second tube section 125 at the opposite end. The two tube sections 122 and 125 are threaded internally, and a threaded connector 126 is afforded therebetween. By turning the connector 126 in one direction or the other, this torque arm 120 can be adjusted in length.

Each torque arm 120 and 121 has a head 130, FIG. 3, at the end opposite the end connected to the frame-mounted bracket 115 or 116. The head 130 in each instance is pivotally associated with a supporting pin in the form of a bolt as has been described, and this pin in turn is supported in a housing member 131. Each such housing member is outward of a strut, and welded to the inner face of each housing member 131 is a connector arm 135 which extends inwardly therefrom and which at its opposite end is welded to the adjacent one of the struts 61 and 62 as shown in FIG. 1.

Thus it will be seen that the torque means 120 and 121 not only serve to tow the center tube 58 but they also effectively prevent marked tendency for the struts 61 and 62 to twist or tilt about a horizontal axis, and resultantly, very little twist of this occurs in the diaphragm 35. Moreover, these torque means also serve to obstruct the struts 61 and 62 from turning about a vertical axis, and this can be viewed as a prevention of turning of the diaphragm in its own plane.

Sway control in a suspension of the kind under consideration is a major problem, and in the present instance sway tendencies are substantially countered by sway braces extended downward from each side of the vehicle frame to the center tube 58. The sway braces are identical in construction and include pivotally connected links and spring means for effectively limiting the extent to which the sway brace links can be straightened. Normally, the links are at an angle one to another with parts bearing against what in effect are spring elements. Thus, as shown in FIGS. 1 to 3, sway braces 140 and 141 at opposite sides of the frames of the vehicle are identical in construction and hence the description of parts is interchangeable.

An outwardly extending spacer in the form of a stub tube 142 is welded to a mounting plate 143, FIG. 3, and the latter is adapted to be secured to the frame of the vehicle as shown in FIG. 1. A pair of link arms 144 and 145 are pivotally connected to the outer end of the arm 142, and this pivotal connection includes a bolt 147, FIG. 1, serving as a pin. A rubber bushing 148 is interposed between the pin 147 and the inner surface of an apertured head 150 which is welded to the outer end of the stub tube 142.

A one-piece connector link 152 extends downwardly from the link arms 144 and 145, and this link at opposite ends is provided with apertured head members 153 and 154. The upper one of the head members 153 is pivotally associated with the link arms 144 and 145 in a manner similar to the way in which the link arms are pivotally associated with the head member 150. In like manner, the lower head member 154 is pivotally associated with a pair of ears 159 provided at the upper end of a mounting bracket 160 located at the end of the center tube. The mounting bracket 160, as shown in FIG. 1, has the inner face thereof seated against the clamp ring 76 that is associated with the bushing sleeve 73 in the manner explained above. An anchor plate 163 is disposed in a fixed relation within the end of the tube 58. A bolt has the head 165H thereof bearing against the inside face of the anchor plate, and the threaded end of the shank of this bolt is outward of the bracket 160, being passed through apertures in the members 160 and 163. A nut 165N is tightened on this bolt to hold the bracket 160 in place and to urge the ring 76 with a constant force up on the outer tapered end of the bushing sleeve 73 thereby substantially holding the bushing assembly 72—73 against rotation on the center tube.

The extent of lateral "play" or motion between the vehicle frame and the suspension is limited by spring means associated with the sway braces, and advantageously such spring means is in the form of a rubber block 170 disposed on each side of the frame and supported by a bracket 172 so as to be disposed outboard of the vehicle frame as shown in FIG. 1. Each bracket 172 is connected to a related mounting plate 143, and the relationship of parts is such that each rubber block 170 is disposed to normally engage the head 153 at the upper end of the related connector link 152. Thus, sway in a left or right hand direction as viewed in FIG. 1 is limited to the extent of compressibility of the associated spring block 170, and it will be appreciated that the spring elements 170 in the form of rubber blocks also constitute shock absorbers or rebound means. This is especially important in connection with vertical movement of the center tube relative to movement of the vehicle. Thus, in the event that one of the wheels with which the present suspension is associated should drop into a chuck hole tending to straighten out a sway brace, the center tube can drop only to the extent that one of the blocks 170 is compressed a maximum extent. Conversely, if the sway brace should tend to assume a more angular condition than that illustrated in FIG. 1 as where a wheel should encounter a hump in the road, this in effect results in movement of a head 153 away from the associated block 170, but when the wheel returns the displaced head will strike the related spring element 170 whereby the latter absorbs the shock and acts as rebound pad. Since the pads 170 actually limit the extent to which the center tube can drop and are always interposing spring resistance to any tendency of the center tube to drop, the vehicle has smoother performance at high speeds since dropping and consequent recovery of the axles is limited. In actual practice, the limit of downward movement of an axle is about three inches.

The present suspension includes an automatic adjustment for air pressure within the air chamber, and this adjustment is responsive to the degree and direction of flexing of the diaphragm. Thus, an air supply line 180 leading from the main reservoir or source of compressed air is connected to a valve 181 of known construction supported on the frame of the vehicle adjacent the air chamber as shown in FIG. 1, and this valve is equipped with a stub hose 183 which communicates with the interior of the air chamber. The valve 181 is of the slide type and can be set in one of two positions as will be explained either to allow compressed air to be supplied to the air chamber through the hose 183, or air to be exhausted from the air chamber through the hose 183 and bled to the atmosphere through an opening in valve 181.

Thus, a valve control arm 185 is connected to the valve slide head, and if the arm 185 is pulled down in a manner to be explained, the valve slide is set to allow more air to enter the air chamber through the stub hose 183. If arm 185 is moved up, the valve slide is set in its other position to allow air to bleed or exhaust from the air chamber through hose 183 and a bleed opening in valve 181. Advantageously, the valve is equipped with delay restrictions so that air is supplied or exhausted only for severe movements of the diaphragm, and not for minor movements.

Connections are therefore extended from the arm 185 to the diaphragm, and these include a threaded vertically disposed actuator link 187 which is adjustably connected to the valve control arm 185. The link 187 has a bent lower end pivotally connected at P1 to one arm of a bell crank lever 188, and the bell crank is pivoted on a pin P2 carried at one end of a support arm 189. The opposite end of arm 189 is welded to the torque arm 120. The other end of the bell crank is pivotally joined at P3 to a pair of parallel link arms 190, and these in turn are pivotally connected to lugs at the underside of the diaphragm.

With these connections, the bell crank 188 will pivot clockwise as viewed in FIG. 2 when the diaphragm is pulled down, and some air is allowed to exhaust from the air chamber if this movement is severe enough; conversely, if the diaphragm is flexed upwardly a predetermined extent more compressed air is admitted to the air chamber to compensate for the increased load. By adjusting the link 187 relative to the valve control arm 185, the level at which the valve control arm is effective on the valve can be predetermined.

It will be seen from the foregoing that under the present invention, an air spring suspension for tandem vehicles is afforded of such construction that loads on the axles can be equalized under circumstances where straining of the diaphragm is minimized by constraining the diaphragm for flexure in substantially horizontal planes at all times, and axle movement is constrained to follow an even vertical keel. Sway is controlled, and the structure used for sway control also limits rebound problems and holds axle drop within predetermined limits. Further, air pressure in the air chamber is automatically compensated in response to significant diaphragm movement, which is to say that when the diaphragm is flexed upward a predetermined extent due to a load impressed on an axle, the air chamber is furnished with that much air to cushion the increased load, and when the diaphragm returns to normal running conditions, that much excess air is allowed to bleed from the air chamber. It will be appreciated that the optimum air pressure in the air chamber is that determined as proper for the cargo load on the vehicle under normally expected road running conditions.

Hence, while I have illustrated and described a preferred embodiment of my invention it is to be understood that this is capable of variation and modification, and I therefore do not wish to be limited to the precise details set forth, but desire to avail myself of such changes and alterations as fall within the purview of the following claims.

I claim:

1. A suspension for tandem axles wherein part of a load impressed on one axle is to be distributed to the other axle and comprising a housing and a flexible diaphragm affording a single pneumatic chamber, a support disposed below and substantially medially of said diaphragm, strut means rigidly interconnecting said diaphragm and said support, a pair of rocker beams pivotally mounted on said support and having connectors at the other ends thereof adapted to be secured to the axles of the vehicle, a first rigid torque arm means pivotally secured at one end for movement with one of said axles and pivotally secured at the opposite end to said support to assure substantially true vertical movement of said axle when loads are impressed thereon, and other rigid torque arm means connected at one end to a part fixed to said strut means above said support and adapted at the other end to be pivotally connected to the frame of the vehicle to provide an arm of fixed radius between the connections at the ends thereof, thereby to limit flexing of the diaphragm substantially to a truly vertical straight line motion and substantially to prevent twisting of the diaphragm in its own plane.

2. A suspension for tandem axles wherein part of a load impressed on one axle is to be distributed to the other axle and comprising a housing and a flexible diaphragm affording a single pneumatic chamber, a support disposed below and substantially medially of said diaphragm, means rigidly interconnecting said diaphragm and said support, a pair of rocker beams pivotally mounted on said support and having connectors at the outer ends thereof adapted to be secured to the axles of the vehicle, rigid torque arm means connected at one end in a nonextendible manner to said means which interconnect said diaphragm and said support and at a location above said support and adapted at the other end to be pivotally connected to the frame of the vehicle to provide an arm of fixed radius between the connections at the ends thereof and movable about the pivotal connection, thereby to limit flexing of the diaphragm substantially to a truly vertical straight line motion and substantially to prevent twisting of the diaphragm in its own plane.

3. A suspension for tandem axles wherein part of a load impressed on one axle is to be distributed to the other axle and comprising a housing and a flexible diaphragm affording a single pneumatic chamber, a support disposed below and substantially medially of said diaphragm, strut means rigidly interconnecting said diaphragm and said support, a pair of rocker beams pivotally mounted on said support and having connectors at the outer ends thereof adapted to be secured to the axles of the vehicle, first rigid torque arm means pivotally secured at one end for movement with said axles and pivotally secured at the opposite ends to said support to assure substantially true vertical movement of the axles when loads are impressed thereon, and other rigid torque arm means connected at one end to a part fixed to said strut means above said support and adapted at the other end to be connected pivotally to the frame of the vehicle to constitute said other torque arm a fixed radius arm between the connections at the ends thereof, thereby to limit flexing of the diaphragm substantially to a truly vertical straight line motion and substantially to prevent twisting of the diaphragm in its own plane, and sway bracing adapted to be connected to said frame and to opposite ends of said support.

4. A suspension according to claim 3 wherein the sway bracing includes a pair of links pivotally connected to one another, with one of said links being pivotally connected to said support and the other of said links being pivotally connected to a spacer in turn adapted to be connected to the frame of the vehicle, there being rebound means interposed between the links of said sway bracing and said vehicle frame.

5. A suspension for tandem axles wherein part of a load impressed on one axle is to be distributed to the other axle and comprising a housing and a flexible diaphragm affording a single pneumatic chamber, a support disposed below and substantially medially of said diaphragm, means rigidly interconnecting said diaphragm and said support, a pair of rocker beams pivotally mounted on said support and having connectors at the outer ends thereof adapted to be secured to the axles of the vehicle, rigid torque arm means connected in a non-extendible manner at end end to said means which interconnect said diaphragm and said support and at a location above said support and adapted at the other end to be connected pivotally to the frame of the vehicle to provide a torque arm of fixed radius between the connections at the ends thereof, thereby to limit flexing of the diaphragm substantially to a truly vertical straight line motion and substantially to prevent twisting of the diaphragm in its own plane, and sway bracing adapted to be connected between said frame and opposite ends of said support, said sway bracing at each end of said support including links pivotally interconnected with one another at an angle and with said support, and resilient means against which at least one of said links is adapted to react to limit the extent to which said links can be straightened.

6. A suspension for tandem axles wherein part of a load impressed on one axle is to be distributed to the other axle and comprising a housing and a flexible diaphragm secured immovably at its outer periphery to the housing to afford a pneumatic chamber, a center support disposed below and substantially medially of said diaphragm, strut means rigidly interconnecting said diaphragm and said support, a pair of rocker beams pivotally mounted on said support and having connectors at the outer ends thereof adapted to be secured to the axles of the vehicle, first rigid torque arm means pivotally secured at one end for movement with said axles and pivotally secured at the opposite end to said center support to assure substantially true vertical movement of said axles when loads are impressed thereon, and other rigid torque arm means connected to a part fixed at one end in a non-extendible manner to a part carried by said strut means which interconnect said diaphragm and said support at a location above said support and adapted at the other end to be connected pivotally to the frame of the vehicle to provide a torque arm of fixed radius between the connections at the ends thereof, thereby to limit flexing of the diaphragm substantially to a truly vertical straight line motion and substantially to prevent twisting of the diaphragm in its own plane, and means responsive to movement of said diaphragm to regulate the air pressure in said pneumatic chamber.

7. A suspension for a tandem axle vehicle wherein part of a load impressed on one axle is to be distributed to the other axle and comprising a housing and a flexible diaphragm secured immovably at its other periphery to the housing to afford a single pneumatic chamber, a support member disposed below and substantially medially of said diaphragm, strut means rigidly interconnecting said diaphragm and said support, a pair of rocker beams pivotally mounted substantially at their centers on said support and having connectors at the outer ends thereof adapted to be secured to the axles of the vehicle, first rigid torque arm means affording a parallelogram with said beam to assure substantially true vertical movement of the axles when loads are impressed thereon, and other rigid torque arm means connected to parts fixed to said strut means and adapted to be connected pivotally to the frame of the vehicle to provide an arm of fixed radius between the connections thereof to the strut means of the frame of the vehicle, thereby to limit flexing of the diaphragm substantially to a truly vertical straight line motion and substantially to prevent twisting of the diaphragm out of its own plane.

8. A suspension for a tandem axle vehicle wherein part of a load impressed on one axle is to be distributed to the other axle and comprising a housing and a flexible diaphragm affording a single pneumatic chamber, a support member disposed below and substantially medially of said diaphragm, strut means rigidly interconnecting said diaphragm and said support, a pair of rocker beams pivotally mounted on opposite ends of said support and having connectors at the outer ends thereof adapted to be secured to the axles of the vehicle, a first pair of rigid torque arms pivotally secured at one end for movement with said beam and pivotally secured at the opposite end to said support to assure substantially true vertical movement of the axles when loads are impressed thereon, and another pair of rigid torque arms each connected at one end thereof to said strut means at fixed locations thereon above said support and adapted at the other end to be pivotally connected to the frame of the vehicle to provide arms of fixed radius between the connections thereof to said strut means and the frame of the vehicle, thereby to limit flexing of the diaphragm substantially to a truly vertical straight line motion and substantially to prevent twisting of the diaphragm in its own plane.

9. A suspension according to claim 8 wherein a valve for controlling admission of air into or exhaust of air from said air chamber is controlled by linkages movable with said diaphragm.

10. A suspension for a tandem axle vehicle wherein part of a load impressed on one axle is to be distributed to the other axle and comprising a housing secured to the frame of the vehicle and a flexible diaphragm secured to said housing and affording a single pneumatic chamber therewith, a tubular support disposed below and substantially medially of said diaphragm, strut means disposed inwardly of the ends of said support and rigidly interconnecting said diaphragm and said support, a pair of rocker beams pivotally mounted on the ends of said support and having connectors at the other ends thereof secured to the axles of the vehicle, a first pair of rigid torque arms extending fore and aft of said support and each pivotally secured at one end to a related one of said axles and each pivotally secured at the opposite end to said support to assure substantially true vertical movement of the axles when loads are impressed thereon, another pair of rigid torque arms each pivotally secured at one end to a connector rigidly secured to said strut means and each pivotally secured at the other end to a bracket connected to the frame of the vehicle to limit flexing of the diaphragm substantially to a truly vertical straight line motion and substantially to prevent twisting of the diaphragm in its own plane, and sway bracing links pivotally connected one to another and to said frame and to opposite ends of said support.

References Cited in the file of this patent
UNITED STATES PATENTS

| | | |
|---|---|---|
| 2,488,288 | Gouirand | Nov. 15, 1949 |
| 2,663,569 | Gouirand | Dec. 22, 1953 |
| 2,755,097 | Elconin | July 17, 1956 |
| 2,790,634 | Fawick | Apr. 30, 1957 |
| 2,865,650 | Chalmers | Dec. 23, 1958 |
| 2,891,786 | Norrie | June 23, 1959 |
| 2,952,474 | Gouirand | Sept. 13, 1960 |